United States Patent [19]
Wang et al.

[11] Patent Number: 5,741,074
[45] Date of Patent: Apr. 21, 1998

[54] LINEAR INTEGRATED SENSING TRANSMITTER SENSOR

[75] Inventors: Theodore P. Wang, N. Caldwell; Michael G. Allen, Bergenfield, both of N.J.; Rienk Oldenkamp, Leiderdorp, Netherlands

[73] Assignee: Thermo Electrioc Corporation, Saddle Brook, N.J.

[21] Appl. No.: 467,950

[22] Filed: Jun. 6, 1995

[51] Int. Cl.$^6$ .................................................. G01K 7/16
[52] U.S. Cl. .................................................. 374/185; 374/173
[58] Field of Search .................................. 374/172, 173, 374/185, 183; 338/25, 28, 30

[56] References Cited

U.S. PATENT DOCUMENTS

| | | | |
|---|---|---|---|
| 3,517,556 | 6/1970 | Barker | 374/173 |
| 4,000,454 | 12/1976 | Brakl | |
| 4,309,653 | 1/1982 | Stack et al. | 374/173 |
| 4,492,948 | 1/1985 | Clayton et al. | 374/185 |
| 4,556,330 | 12/1985 | Regtien | |
| 4,654,623 | 3/1987 | Steinschulte | 338/28 |
| 4,729,672 | 3/1988 | Takagi | 374/185 |
| 5,178,468 | 1/1993 | Shiokawa et al. | 374/185 |
| 5,317,520 | 5/1994 | Castle | 374/183 |
| 5,340,019 | 8/1994 | Bohan, Jr. et al. | 374/183 |
| 5,522,663 | 6/1996 | Fichter et al. | 374/183 |
| 5,558,436 | 9/1996 | Richards | 374/208 |

FOREIGN PATENT DOCUMENTS 2459623  6/1975  Germany.

*Primary Examiner*—William A. Cuchlinski, Jr.
*Assistant Examiner*—Andrew Hirshfeld
*Attorney, Agent, or Firm*—Plevy & Associates

[57] ABSTRACT

A Linear Integrated Sensing Transmitter Sensor for measuring and reporting temperature has a housing defining a cavity therethrough, a resistance temperature within the housing, and a transmitter disposed within the housing connected to the resistance temperature detector for providing a current which is a linear function of the temperature sensed by the resistance temperature detector. The transmitter further includes an excitation current means for applying an excitation current to the resistance temperature detector, a converter means for converting a detected voltage to a current, and a feedback means for adjusting a feedback current to maintain the voltage as a linear function of the temperature sensed.

12 Claims, 6 Drawing Sheets

LINEAR INTEGRATED SENSING TRANSMITTER SENSOR

RELATED APPLICATIONS

The Assignee herein, Thermo Electric International B.V., is the record owner of U.S. Patent application entitled, LINEARIZATION CIRCUIT, Ser. No. 07/222,412, filed Jul. 21, 1988, for Dr. Carlos Alberto Dos Reis Filho, NOW ABANDONED.

FIELD OF THE INVENTION

The present invention relates generally to a temperature sensor, and more particularly, to a temperature sensor which integrates an RTD (Resistance Temperature Detector) and a transmitter into a single compact assembly.

BACKGROUND OF THE INVENTION

Temperature is a critical process variable in various industries and technologies. In these instances, the quality of the process or product of heat treatment depends on the accuracy of the temperature measured, particularly for the more sophisticated products or processes.

Behind thermocouples, RTD's are the most favored temperature sensors used in the measurement and control of temperature today. While thermocouples can be used for measuring a wider range of temperatures than RTD's, −270° C. to over 2000° C. versus −196° C. to 850° C., RTD's are the more accurate and stable measurement device. In fact, RTD's can measure temperature to the hundredths or even thousandths of a degree centigrade at ambient to moderate temperatures while thermocouples are limited to measurements of only a fraction of a degree centigrade. Therefore, where accuracy and stability of operation requirements are critical and the temperature measured is ambient and moderate, RTDs are the preferred sensor for the measurement and control of temperature.

For most temperature sensors, temperature cannot be measured directly, but must be obtained indirectly through the measurement of a dependent variable that has a definite and reproducible relationship to temperature. For RTD's, the dependent variable on temperature is resistance. For example, an RTD with a platinum resistive element with a temperature coefficient of resistance of 0.00385 ohm per ohm per degree centigrade has a resistance that follows the below quadratic relationships:

For temperatures between 0° C. and 850° C.:

$$R_T = R_0(1 + AT + BT^2); \text{ and}$$

For temperatures between −200° C. and 0° C.:

$$R_T = R_0[1 + AT + BT^2 - C(T - 100° \text{ C.})]T^3$$

where $R_T$=resistance of the RTD at temperature T $R_0$=resistance of the RTD at 0° C.

T=temperature of the sensors in ° C.

A, B, C are coefficients which are constants.

It should be noted that the above Calendar Equations are well known to people skilled in the art.

Furthermore, the accuracy of the RTD is dependent on the resistance of its elements, i.e., the purity, trim, and length of the platinum resistive element and method of construction. However, the resistance obtained does not follow a straight line relationship with temperature. For measurement purposes, it is desirable to have a linear relationship between resistance and temperature.

Several solutions to this problem have been attempted. For example, German Patent No. 2,459,623 to Bruyere discloses a platinum sensor thermometer whereby an extra resistor is connected between an amplifier output and input and to a referenced resistor. A feedback resistor is provided between the output and a platinum sensor having a feedback value of a few percent. The platinum sensor has a resistance that is dependent on the temperature sensed which is expressed by a quadratic relationship. Accordingly, the circuit design enables the resistance to be represented by an approximately linear function over the range −200° C. to 1000° C., with a tolerance that is greater than one part in 1000.

However, the linearization circuitry described in Bruyere is complicated by the implementation of at least two externally mounted Zener diodes.

U.S. Pat. No. 4,000,454 to Braki and U.S. Pat. No. 4,556,330 to Regtien also addressed this problem. For example, Braki discloses a linearization apparatus for a non-linear resistive transducer in a self-balancing bridge connection, whereby the non-linear characteristics of the resistive transducer are linearized by changing the voltage impressed on the bridge as the resistance of the transducer changes.

However, such arrangement also contained several disadvantages. Of primary disadvantage is the external placement of the linearization circuit from the temperature sensor. Such non-integrated configurations often provide inaccurate readings. In addition, such devices are unstable, whereby the failure of one or more of its components results in the failure of the entire device. Furthermore, the use of separate components frequently results in higher installation costs. Finally, such multi-component devices are non-ideal where clearance limitations exist. Accordingly, it is the purpose of the present invention to overcome or eliminate such inefficiencies and disadvantages by integrating a miniature transmitter and a resistive temperature detecter within a single housing to provide a sensor that is more accurate, more compact, less costly, easier to install and operate, and more stable than the two component devices known in the prior art.

SUMMARY OF THE INVENTION

The present invention is directed to linear integrated sensing transmitter (LIST) sensor which integrates a temperature sensing device and a transmitter within a single, compact housing, whereby the transmitter linearizes the temperature sensing device's response to temperature. The present invention comprises a miniaturized housing, a transmitter, and a resistance temperature detector. The housing defines a cavity therethrough which houses the transmitter and the resistance temperature detector. The transmitter provides a current which is a linear function of the temperature sensed by the resistance temperature detector.

BRIEF DESCRIPTION OF THE DRAWINGS

The foregoing and other objects, features, and advantages of the invention will be apparent from the following more particular description of the preferred embodiments of the invention, as illustrated in the accompanying drawings, wherein.

DETAILED DESCRIPTION OF THE INVENTION

Figure 1:
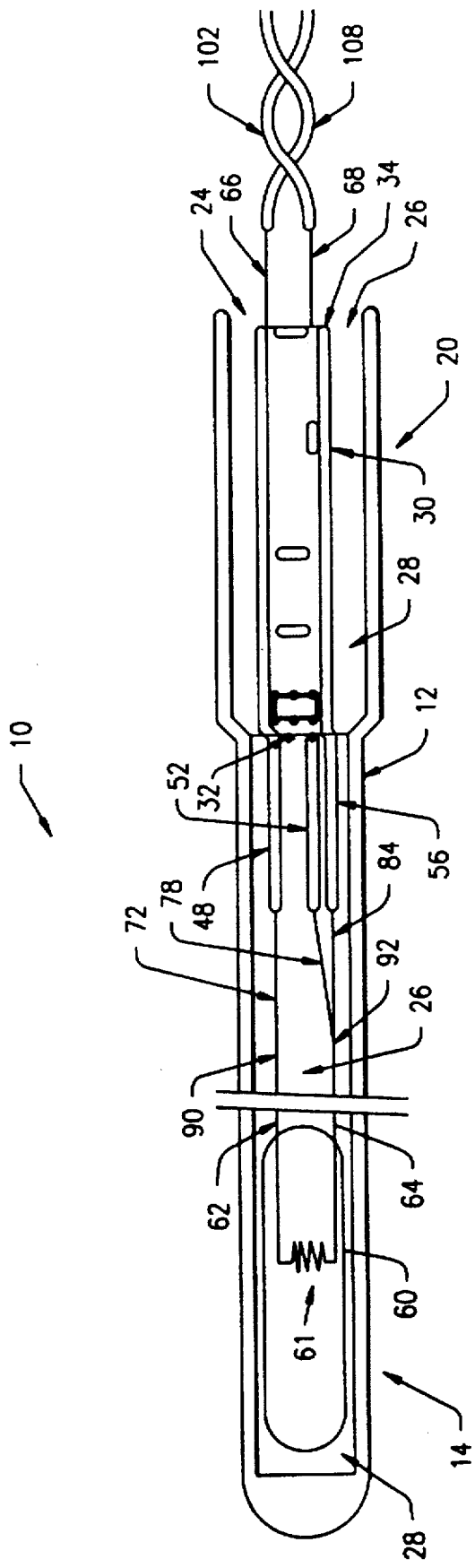
FIG. 1 is a sectional view of an exemplary embodiment of the Linear Integrated Sensing Transmitter Sensor of the present invention.

With reference now to FIG. 1, there is shown an exemplary embodiment of the integrated resistance temperature detector and transmitter of the present invention, hereinafter referred to as a Linear Integrated Sensing Transmitter (LIST) Sensor 10. The sensor 10 comprises an elongated cylindrical housing 12 for receiving a miniaturized transmitter 30 coupled to a resistance temperature detector 60.

The housing 12 is preferably fabricated from Inconel or a 316 steel, although it can be fabricated from any suitable metal which is capable of protecting the sensing element while quickly responding to changes in temperature. The housing 12 comprises a cylindrical tip portion 14 and a cylindrical transition portion 20. The tip portion 14 and the transition portion 20 are connected together by crimping the transition portion around the tip portion, the assembled housing 12 defines a cavity 26 therethrough.

In the exemplary embodiment shown in FIG. 1, the transition portion 20 of the housing 12 has a length of 4" and an outer diameter of 5/16"(0.312). The tip portion 14 of the housing 12 has a length of 18" and an outer diameter of 3/16", 1/4", or 1/8". It should be understood that the above dimensions are merely illustrative and may be altered to adapt the sensor to different applications.

Disposed within the cavity 26 of the tip portion 14 of the housing 12 is the resistance temperature detector 60 which comprises a 100 ohm, 0.00385 alpha Class B type bulb, although a Class A bulb can be substituted. Disposed within the bulb 60 is a platinum resistive element 61. The resistive element 61 includes a first platinum lead 62 and second platinum lead 64 which extend from within the bulb 60.

Figure 2:
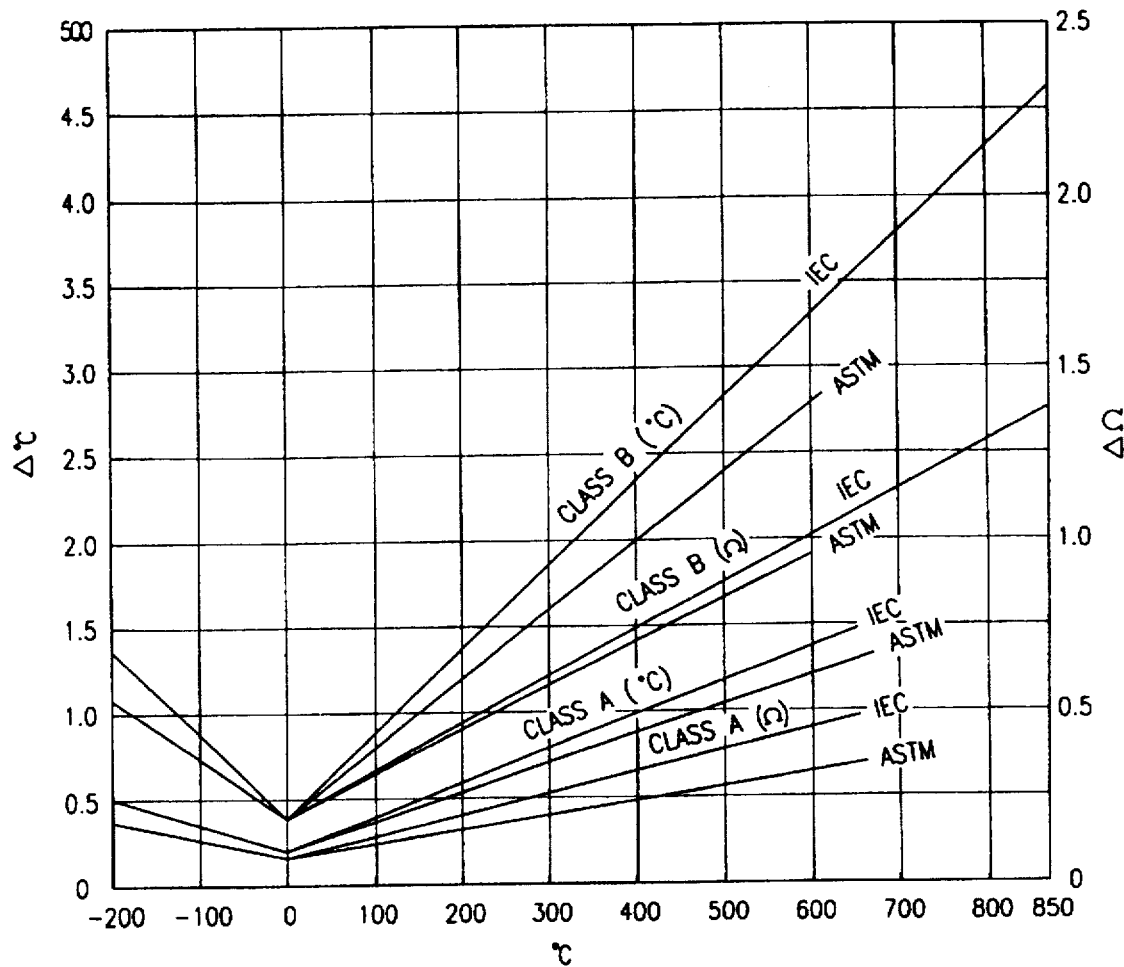
FIG. 2 is a plot of tolerance in °C of 100 ohm industrial resistive thermometers, ASTM verses IEC (for α=0.00385).

The initial tolerance of the bulb 60 is shown in FIG. 2. For example, the tolerance of resistance for a 100 ohm, Class A bulb is ±0.05 ohm or ±0.13° C. The tolerance of resistance for a Class B bulb is ±0.10 ohm or 0.25° C. At lower or higher temperature, the tolerance is higher. Again it is to be understood that the present invention is not restricted to the above resistance temperature detector 60; other temperature sensing means fall within the scope of this invention.

Disposed within the transition portion 20 of the housing 12 is the miniaturized transmitter 30. The exemplary embodiment shown in FIG. 1 incorporates a standard 4–20 mA transmitter 30 to achieve linearization. The transmitter 30 is miniaturized using well known surface mount technology. Extending outward from a first end 32 of the transmitter 30 are three metallic terminals comprising a first input terminal 48, a second input terminal 52, and a third input terminal 56. Extending outward from a second end 34 of the transmitter 30 are two metallic terminals comprising a first output terminal 66 and a second output terminal 68. The transmitter 30 is secured within the cavity 26 of the transition portion 20 of the housing 12 with an mount of sealant 28 or any other suitable potting compound.

FIGS. 3A–D are schematic representations of four exemplary embodiments of the transmitter 30. The embodiment shown in FIG. 3A includes a power supply 36, a voltage-to-current converter 38, a constant current source 40, a feedback resistor 42, a return path resistor 44, and a voltage source 46.

In general, the aforementioned elements form an arrangement which is connected to the power supply 36 via its positive and negative terminals. The circuit serves as a signal conditioner for the resistance temperature detector 60, and provides a current output signal that is linearly related to the temperature being experienced by the resistance temperature detector 60.

The constant current source 40 acts as an excitation current source or current sink for applying current $I_X$ to the resistance temperature detector 60. A junction 124 between the source 40 and resistance temperature detector 60 is connected to the input of the converter 38, as well as to the feedback resistor 42. The converter 38 and the source 40 are commonly biased by the power supply 36 via its positive terminal. The converter 38 provides, at its output, a current signal having a linear function relationship to the voltage E, appearing at the input of the converter 38, which can be expressed by the following equation:

$$I_L = I_O + K \cdot E \qquad (1)$$

In the latter equation, $I_O$ is an offset current, K is the voltage-to-current conversion factor in amperes/volts, and "." signifies multiplication.

The output current $I_L$ of the converter 38 is split into two portions. One portion flows through the resistor 44, the other portion flows through the feedback resistor 42. The voltage E at the input of the converter 38 results from the addition of the voltage provided by the voltage source 46 and the voltage developed across the resistance temperature detector 60 (through excitation current $I_X$). The excitation current is given by the following equation:

$$I_X = I_R - I_F \qquad (2)$$

In the latter equation, $I_R$ is a constant current from the source 40, while $I_F$ varies in accordance with the current resistance value $R_T$ of the resistance temperature detector 60. The value of current $I_F$ is given by the following equation:

$$I_F = \frac{1}{(R_A + R_F)} [E \cdot (1 - K \cdot R_A) - R_A \cdot I_O] \qquad (3)$$

where $E = V_{R+} R_T I_X$

The resistance of the resistance temperature detector 60 is related to the temperature by the following equation:

$$R_T = RT_O (1 + \alpha \cdot t + \beta \cdot t^2) \qquad (4)$$

where $RT_O$ is the resistance value at zero degrees Celsius, $\alpha = 3.9 \times 10^{-3} K^{-1}$ and $\beta = -5.8 \times 10^{-7} K^{-2}$.

Consequently, the following relationship for the voltage E at the input of the converter can be established:

$$\frac{E}{E_R} = \frac{(b+c) + \alpha \cdot b \cdot t + \beta \cdot b \cdot t_2}{(a+1) + \alpha \cdot a \cdot t + \beta \cdot a \cdot t_2} \qquad (5)$$

where $$E_R = RT_O \cdot I_R \qquad (6)$$

-continued $$a = \frac{(1 - K \cdot R_A)}{(R_A + R_F)} \cdot RT_O \quad (7)$$

$$b = 1 + \frac{(R_A \cdot I_O)}{(R_A + R_F)} \cdot \frac{1}{I_R} \quad (8)$$

$$c = \frac{V_R}{I_R} \cdot \frac{1}{RT_O} \quad (9)$$

The relationship (5), which is a rational polynomial, can be rewritten as:

$$\frac{E}{E_R} = r_0 + r_1 \cdot t + r_2 \cdot t_2 \quad (10)$$

where:

$$r_0 = \frac{b+c}{a+1} \quad (11)$$

$$r_1 = \alpha \cdot (b - a \cdot c) \quad (12)$$
$$r_2 = (b - a \cdot c) \cdot [\beta - (a + 1) \cdot a \cdot \alpha^2] \quad (13)$$

As the output current of the converter 38 is linearly related to the input voltage E, it is necessary to cancel the second-order term in equation (10) to achieve linearization of this parameter.

That is:

$$\frac{\beta}{\alpha^2} = a \cdot (a + 1) \quad (14)$$

By substituting equation (7) into equation (14), an expression for the feedback resistance can be established:

$$R_f = \frac{-B - \sqrt{(B^2 - 4 \cdot A \cdot C)}}{2 \cdot A} \quad (15)$$

where:

$$A = \frac{\beta}{\alpha_2} \quad (16)$$

$$B = 2 \cdot R_A \cdot A - RT_O \cdot (1 - K \cdot R_A) \quad (17)$$
$$C = A \cdot R_A^2 - RT_O \cdot R_A \cdot (1 - K \cdot R_A) - RT_O^2 \cdot (1 - K \cdot R_A)^2 \quad (18)$$

Therefore, given a voltage-to-current conversion factor K, a resistance value $R_A$, and the zero-degree Celsius value of $R_T$, the feedback resistance RF is calculated from equation (15) to establish the linearization of the output current of the sensor. For example, where K =0.175 amperes/volts, $RT_O$= 100 ohms and $R_A$=50 ohms, then $R_F$=19.5 Kohms.

Figure 3A:
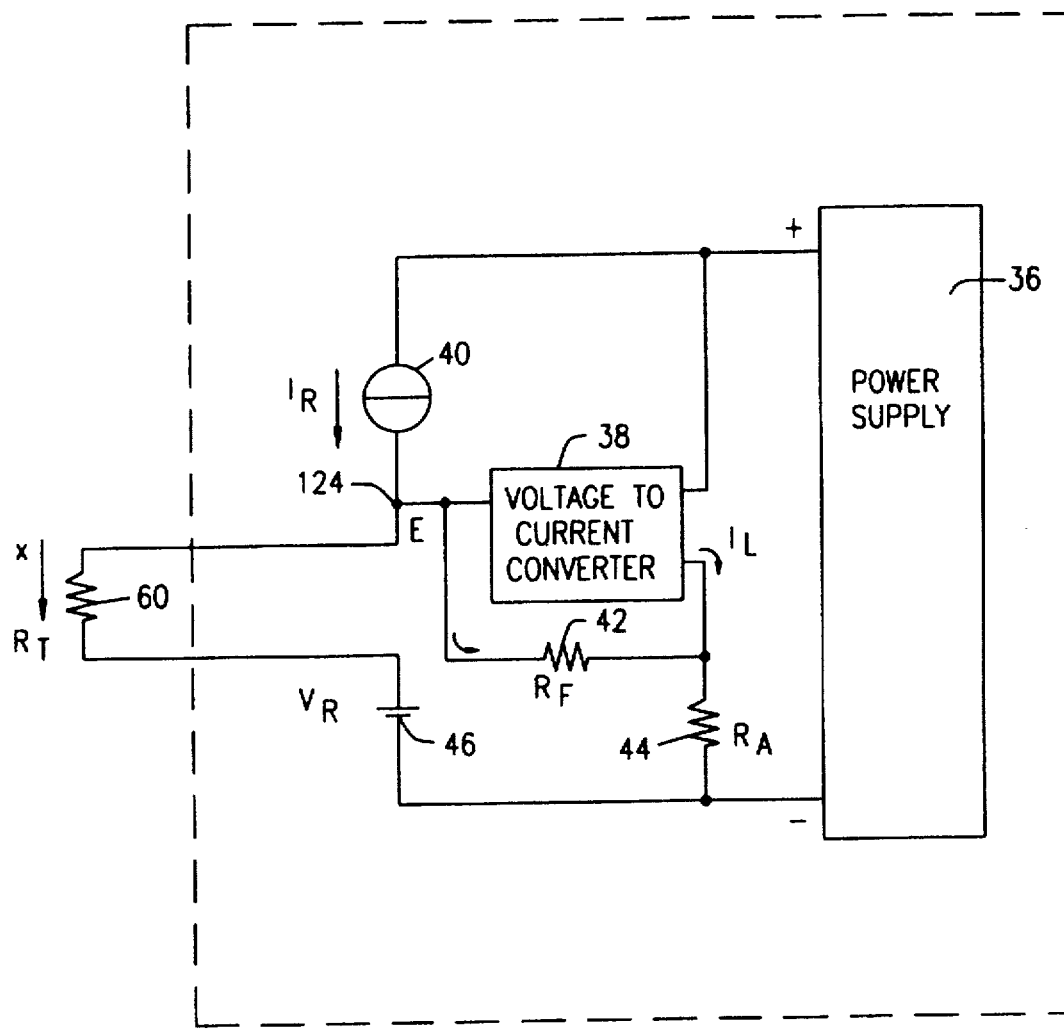
FIG. 3A is a schematic representation of a first embodiment of the transmitter of the present invention.
Figure 3B:
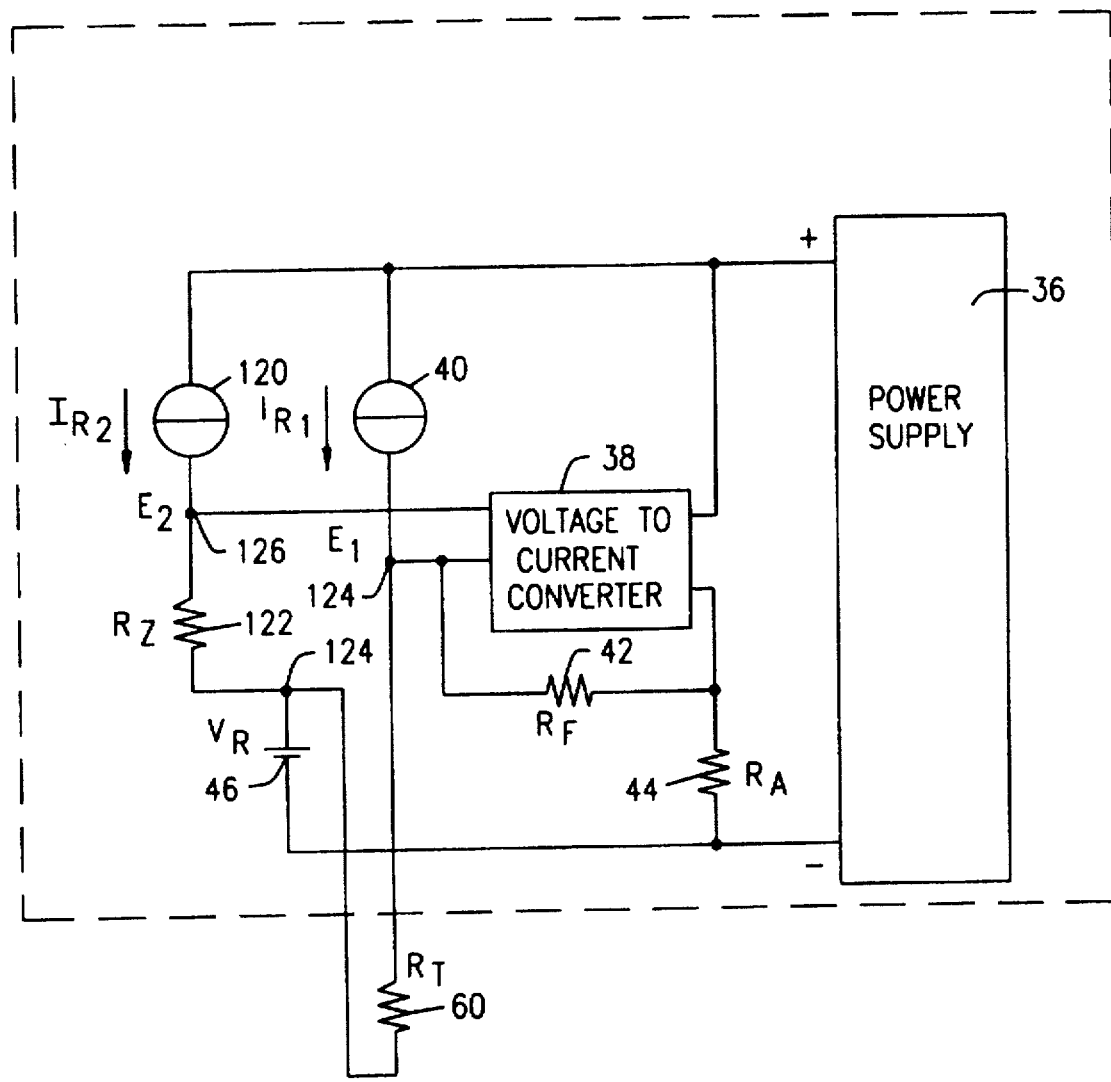
FIG. 3B is a schematic representation of a second embodiment of the transmitter of the present invention.

FIG. 3B is a schematic representation of a second embodiment of the transmitter 30 of the present invention. Where appropriate, reference numerals identical to those used in FIG. 3A have been retained in FIG. 3B.

In the embodiment shown in FIG. 3B, an additional constant current source 120 is connected in series with a resistor 122, and the latter series-connected circuit elements are connected in parallel with the source 40 and the resistance temperature detector 60; the resistance temperature detector 60, the resistor 122 and the voltage source 46 being connected at a first junction 124. A second junction 126 between the source 120 and the resistor 122 is connected to an additional input of the converter 38. Thus, the converter 38 has a differential input; the converter 38 detects the voltage $E_1$ between the source 40 and the resistance temperature detector 60, and also detects the voltage $E_2$ between the source 40 and the resistor 122.

Figure 3C:
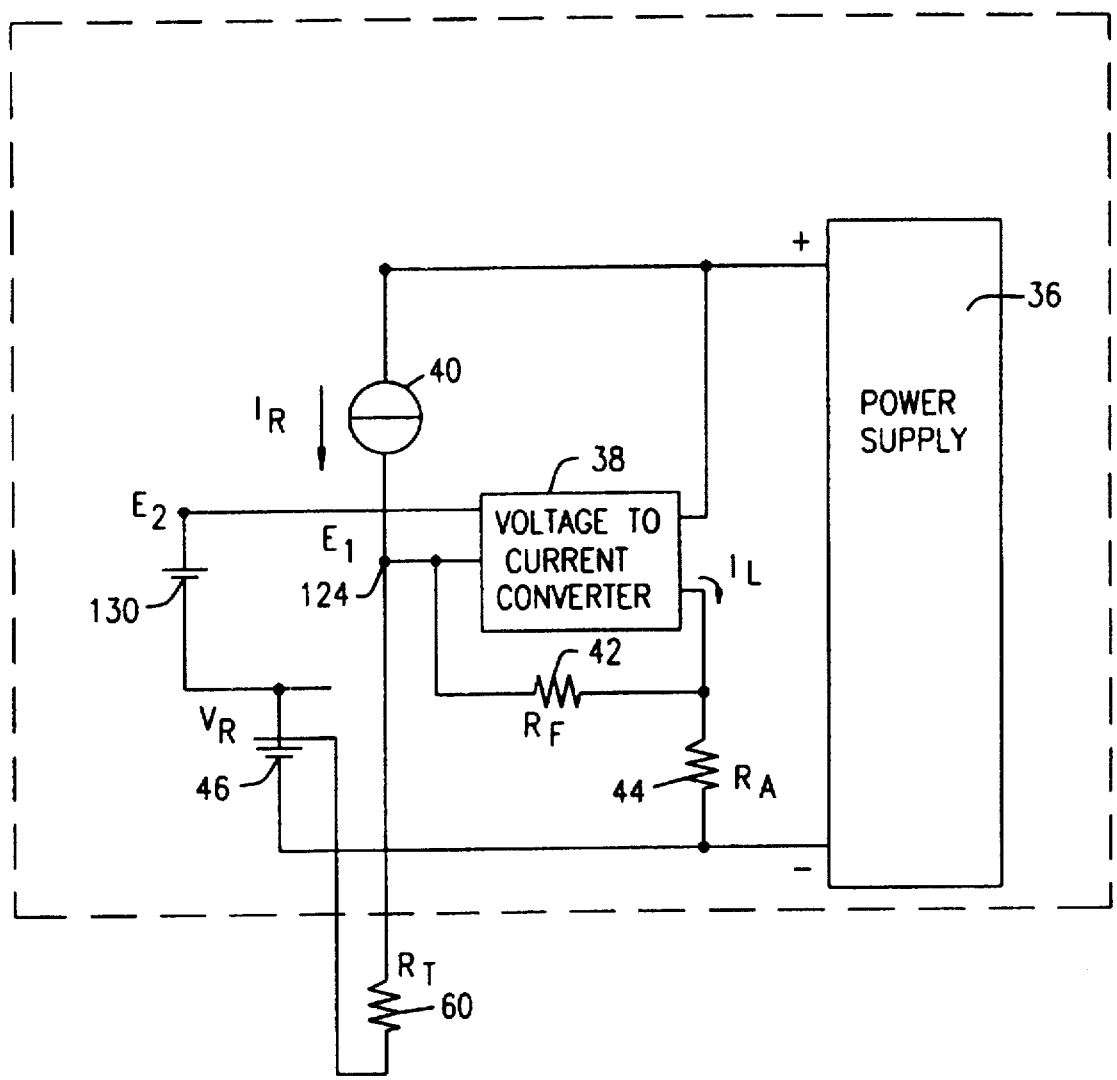
FIG. 3C is a schematic representation of a third embodiment of the transmitter of the present invention.

FIG. 3C is schematic representation of a third embodiment of the transmitter 30 of the present invention. Where appropriate, reference numerals identical to those employed in previous FIG. 3A have been retained in FIG. 3C.

In the embodiment shown in FIG. 3C, a voltage source 130 is connected between an additional input of the converter 38 and the first junction 124 between the resistance temperature detector 60 and the voltage source 46. This amounts to a differential arrangement of the converter 38 in that the converter detects the voltage $E_1$ between the source 40 and the resistance temperature detector 60, and also detects the voltage $E_2$ at the positive terminal of the voltage source 130.

Figure 3D:
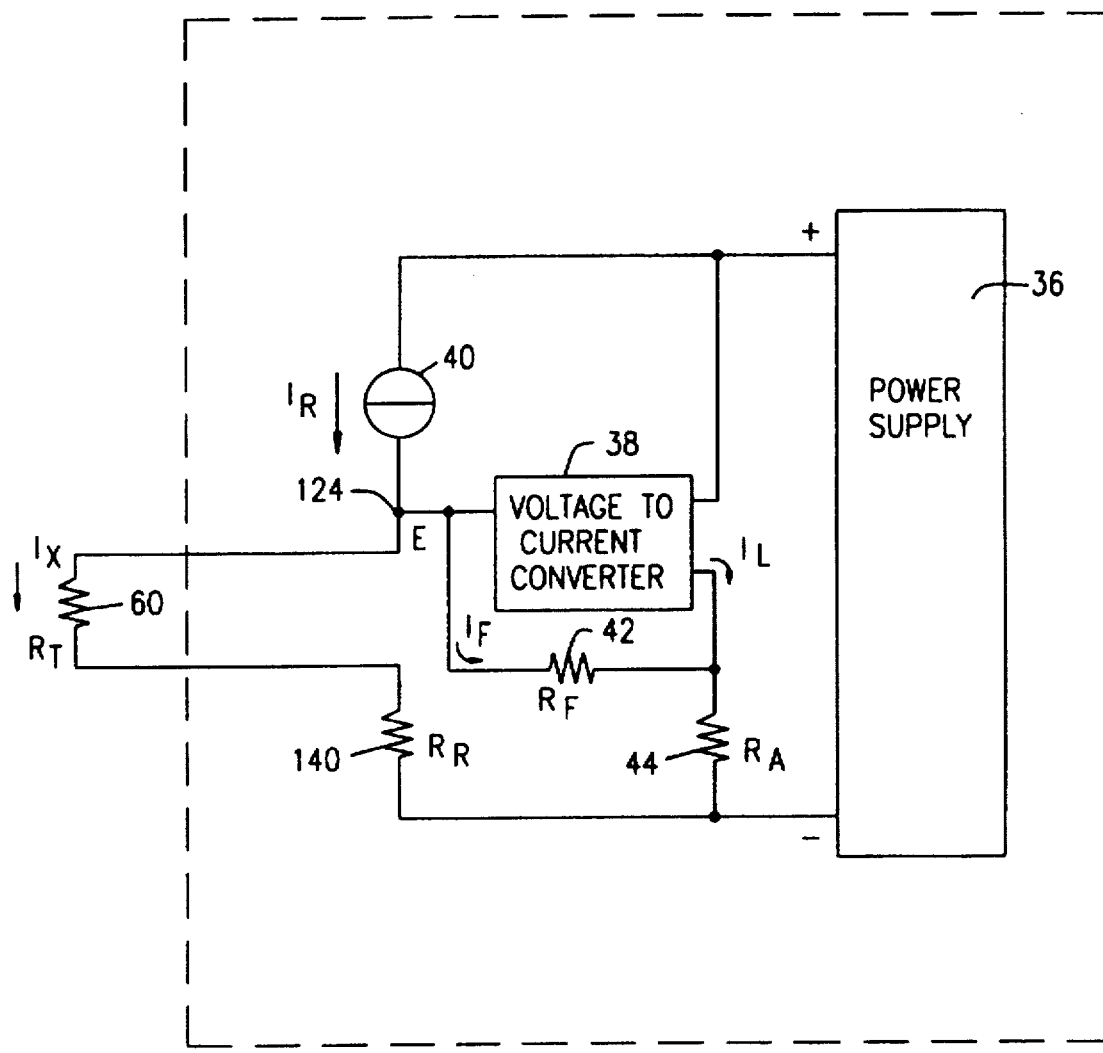
FIG. 3D is a schematic representation of a fourth embodiment of the transmitter of the present invention.

FIG. 3D is a schematic representation of a fourth embodiment of the transmitter of the present invention. Where appropriate, reference numerals identical to those employed in previous FIG. 3A have been retained in FIG. 3D.

In the embodiment shown in FIG. 3D, a fixed-value resistor 140 replaces the voltage source 46 employed in the embodiment of FIG. 3c. The embodiment of FIG. 3d is especially suitable in cases where the amount of correction current or feedback current, $I_F$, is only a small fraction of the excitation current $I_X$.

Furthermore, it should be noted that the substitution of the fixed-value resistor 140 for the voltage source 46 of FIG. 3A is also valid for the embodiments of FIGS. 3B and 3C. The voltage sources 46 can be replaced by the fixed-value resistor 140, especially in cases where the amount of correction current or feedback current, $I_F$, is only a small fraction of the excitation current $I_X$.

It should be noted that the power supply 36 in FIGS. 3A-D can be any conventional power supply. Similarly, the voltage-to-current converter 38 can be any conventional voltage-to-current converter, and the constant current sources 40, 120 can be any conventional constant current sources known to those of skill in the art. Furthermore, it should be understood that the transmitter 30 of the present invention is not restricted to the embodiments disclosed above; other transmitters or similar devices can be substituted provided that they fit completely within the transition portion 20 of the housing structure 12 and are capable of linearizing the output of the resistive temperature detector 60.

The transmitter 30 and the resistive temperature detector 60 are coupled together with three alloy leads. Specifically, the input leads 48, 52, 56 are soldered to a first alloy lead 72, a second alloy lead 78, and a third alloy lead 84, respectively. The alloy leads 72, 78, 84 are preferably composed of a Constantan alloy which contains nickel and copper as major constituents and small mounts of manganese, iron, cobalt, and carbon. This alloy exhibits a medium electrical resistivity of approximately 300Ω/circular mil foot with a low temperature coefficient of resistance of approximately 10 ppm/° C. It should be noted, however, that other suitable medium electrical resistive alloy can be used for the leads.

The alloy leads 72, 76, 84 couple the transmitter 30 to the resistance temperature detector 60. Specifically, the first alloy lead 72 is welded to the first platinum bulb lead 62 at a first junction 90. The second alloy lead is welded to the second platinum bulb lead 64 at a second junction 92. The third alloy lead 84 is also welded to the second platinum bulb lead 64 at the second junction 92.

The LIST sensor 10 is adapted for communication with a processing device such as a computer. Specifically, the first 66 and second 68 output terminals of the transmitter 30 are connected to a pair of output leads, first copper lead 102 and second copper lead 108. The copper leads 102, 108 extend from an output end 24 of the transition portion 20 of the housing 12 and are connected to the processing device. The output end 24 of the housing 12 is sealed via standard sealing techniques.

Accordingly, the resulting invention provides a temperature transmitter 10 that integrates a resistance temperature detector 60 and a transmitter 30 into a single compact assembly that achieves not only linearization and miniaturization, but offers improvements in accuracy and stability.

For example, the present invention offers a ≦0.1% of full scale accuracy. Many transmitters that cost over three times the cost of the LIST sensor offer only 0.2% of full scale, plus the tolerance of the RTD.

Second, the resulting output falls well within required standards. The following table illustrates the linearization effects of the LIST sensor as calibrated against standard platinum resistance thermometers over test temperatures at 25%, 50%, and 75% of the full scale:

| RTD NUMBER | Ro.ohms | Change in Ro.ohms | CLASS |
| --- | --- | --- | --- |
| 1 | 99.93 | −.07 | B |
| 2 | 99.97 | −.01 | A |
| 3 | 99.95 | −.05 | A(Marginal) |
| 4 | 99.98 | −.02 | A |
| 5 | 99.95 | −.05 | A(Marginal) |

Tolerance A = 100 ± .05 ohms
B = 100 ± .10 ohms

As the table demonstrates, LIST sensor devices 1–5 completely meet Class A requirements although they comprise of mostly Class B resistance temperature detector.

Third, the small size of the LIST sensor 10 makes it ideal for OEM applications and for all installations where clearance does not allow the use of a connection head. The LIST sensor 10 is only 4" long at the top of the tip portion 14, much less than conventional transmitter and devices.

Fourth, the LIST sensor 10 offers estimated savings of 25% to 40% in installation costs as compared to standard constructions.

Fifth, no field calibrations are required, which eliminates frequently occurring errors.

Sixth, the sensor is simple to operate; operation only requires the connection of two output leads 102, 108.

While preferred forms and arrangements have been shown in illustrating the invention, it is to be understood that various changes may be made without departing from the spirit and scope of this disclosure.

What is claimed is:

1. A temperature sensor for measuring and reporting temperature, comprising:
   an elongated tubular housing having a tip portion with a sealed end and a transition portion with a sealed end, said housing having an elongated cavity therethrough;
   a resistance temperature detector contained within said tip portion of said housing said resistance temperature detector having a resistance value which increases with increasing temperature;
   an elongated circuit board contained within said transition portion of said housing, said circuit board comprising a transmitter means for providing a current which is a linear function of the temperature sensed by said resistance temperature detector, said transmitter means including:
      excitation current means connected to said resistance temperature detector at a common junction for exhibiting an electrical characteristic in response thereto;
      converter means connected to said excitation current means and to said resistance temperature detector at said common junction for detecting a voltage at said common junction, said voltage at said common junction varying as the electrical characteristic of said resistance temperature detector varies, said converter means converting said voltage to a current;
      feedback means for connecting said converter means to said common junction and having a feedback current flowing therethrough, said feedback means being responsive to said current at the output of said converter means for adjusting said feedback current so as to adjust the voltage at said common junction and said excitation current applied to said resistance temperature detector, thereby maintaining across said resistance temperature detector a voltage which is a linear function of a condition sensed by said resistance temperature detector; and
   power supply means having a first terminal connected to said excitation current means and a second terminal connected to said resistance temperature detector for supplying power thereto.

2. The temperature sensor of claim 1, wherein said transmitter means has an output of 4–20 mA.

3. The temperature sensor of claim 1, wherein said resistance temperature detector is a 100 ohm bulb.

4. The temperature sensor of claim 3, wherein said bulb comprises a platinum filament and a plurality of platinum leads.

5. The temperature sensor of claim 1, wherein said resistance temperature detector is secured within said tip portion of said housing means with a potting compound.

6. The temperature sensor of claim 1, wherein said transmitter means is secured within said transition portion of said housing means with a potting compound.

7. The temperature sensor of claim 1, wherein said transmitter means further includes a first, second and third alloy lead connecting said resistance temperature detector and said transmitter, wherein said alloy leads are composed of an electrical resistive alloy having an electrical resistivity of approximately 300Ω/circular rail foot and a low temperature coefficient of resistance of approximately 10ppm/° C.

8. A temperature sensor for measuring and reporting temperature, comprising:
   an elongated tubular housing comprising a tip portion with a sealed end and a transition portion with an sealed end, said housing means having a cavity therethrough;
   a resistance temperature detector contained within said tip portion of said housing said resistance temperature detector having a resistance value which increases with increasing temperature;
   an elongated circuit board housed within said transition portion of said housing, said circuit board comprising a transmitter means coupled to said resistance temperature detector, wherein said transmitter means provides a current which is a linear function of the temperature sensed by said resistance temperature detector, said transmitter means including:
      excitation current means connected to said resistance temperature detector at a common junction for applying an excitation current to said resistance temperature detector, said resistance temperature detector exhibiting an electrical characteristic in response thereto;
      converter means having an input connected to said excitation current means and to said resistance temperature detector at said common junction for detecting a voltage at said common junction, said voltage at said common junction varying as the electrical characteristic of said resistance temperature detector varies, said converter means converting said voltage at said common junction to a current provided at an output of said converter means;

feedback means for connecting said output of said converter means to said common junction and having a feedback current flowing therethrough, said feedback means being responsive to said current at the output of said converter means for adjusting said feedback current so as to adjust the voltage at said common junction and said excitation current applied to said resistance temperature detector, thereby maintaining across said resistance temperature detector a voltage which is a linear function of a condition sensed by said resistance temperature detector; and power supply means having a first terminal connected to said excitation current means and a second terminal connected to said resistance temperature detector for supplying power thereto.

9. The temperature sensor of claim 8, wherein said resistance temperature detector is a 100 ohm bulb.

10. The temperature sensor of claim 9, wherein said bulb includes a platinum filament and a plurality of platinum leads.

11. The temperature sensor of claim 8, wherein said resistance temperature detector is secured within said tip portion of said housing means with a potting compound.

12. The temperature sensor of claim 8, wherein said transmitter means is secured within said transition portion of said housing means with a potting compound.

* * * * *